(12) United States Patent
Johnston

(10) Patent No.: US 8,981,195 B2
(45) Date of Patent: Mar. 17, 2015

(54) CYMBAL EDGE GUARD

(71) Applicant: Roderick D Johnston, Burnsville, NC (US)

(72) Inventor: Roderick D Johnston, Burnsville, NC (US)

(\*) Notice: Subject to any disclaimer, the term of this patent is extended or adjusted under 35 U.S.C. 154(b) by 0 days.

(21) Appl. No.: 14/060,161

(22) Filed: Oct. 22, 2013

(65) Prior Publication Data

US 2014/0116228 A1 May 1, 2014

Related U.S. Application Data

(60) Provisional application No. 61/718,467, filed on Oct. 25, 2012.

(51) Int. Cl.
*G10D 9/00* (2006.01)
*G01D 13/06* (2006.01)

(52) U.S. Cl.
CPC ...................................... *G01D 13/06* (2013.01)
USPC .......................................................... 84/453

(58) Field of Classification Search
CPC .................................. G10D 9/00; G10D 13/06
See application file for complete search history.

(56) References Cited

U.S. PATENT DOCUMENTS

| | | | | |
|---|---|---|---|---|
| 2,328,574 A | * | 9/1943 | Mueller | 84/382 |
| 3,451,169 A | * | 6/1969 | Bell et al. | 49/462 |
| 3,635,117 A | * | 1/1972 | Nagao | 84/380 R |
| D267,494 S | * | 1/1983 | Hardy | D17/22 |
| D283,464 S | * | 4/1986 | Ogden | D3/204 |
| D285,778 S | * | 9/1986 | Smith | D9/434 |
| 4,880,130 A | * | 11/1989 | Blake | 220/655 |
| D308,217 S | * | 5/1990 | Cohen | D17/22 |
| 5,088,377 A | * | 2/1992 | Delecaris | 84/422.3 |
| D379,588 S | * | 6/1997 | Pledger et al. | D9/434 |
| 5,922,980 A | * | 7/1999 | Arteaga | 84/411 M |
| 6,177,622 B1 | * | 1/2001 | Green | 84/453 |
| 6,448,482 B2 | * | 9/2002 | Cerro | 84/422.3 |
| 7,049,501 B2 | * | 5/2006 | Shellhammer et al. | 84/400 |
| 7,763,788 B2 | * | 7/2010 | Wachter | 84/411 M |
| 8,304,640 B1 | * | 11/2012 | Barnfield et al. | 84/453 |
| 8,642,869 B2 | * | 2/2014 | Prefontaine | 84/422.3 |
| 2004/0011186 A1 | * | 1/2004 | Hester, III | 84/453 |
| 2009/0013852 A1 | * | 1/2009 | Perry | 84/453 |
| 2011/0253568 A1 | * | 10/2011 | Wright | 206/314 |
| 2014/0116228 A1 | * | 5/2014 | Johnston | 84/402 |

\* cited by examiner

*Primary Examiner* — Robert W Horn
(74) *Attorney, Agent, or Firm* — Joseph E. Root

(57) ABSTRACT

A cymbal edge guard. The edge guard can be described as a generally U-shaped, flexible annulus, the open end of the annulus being oriented toward the center of the annulus, the annulus being dimensioned to fit over the outer perimeter of a cymbal. The edge guard may further include a gripping tongue, formed within the U-shaped portion of the annulus. Additionally, a protective bulb may be integrally formed with the outer edge of the edge guard. A double cymbal edge guards may further be provided, dimensioned to fit over the outer parameters of a matched pair of cymbals, the cymbals being arranged bottom to bottom with their peripheral edges in registration.

10 Claims, 4 Drawing Sheets

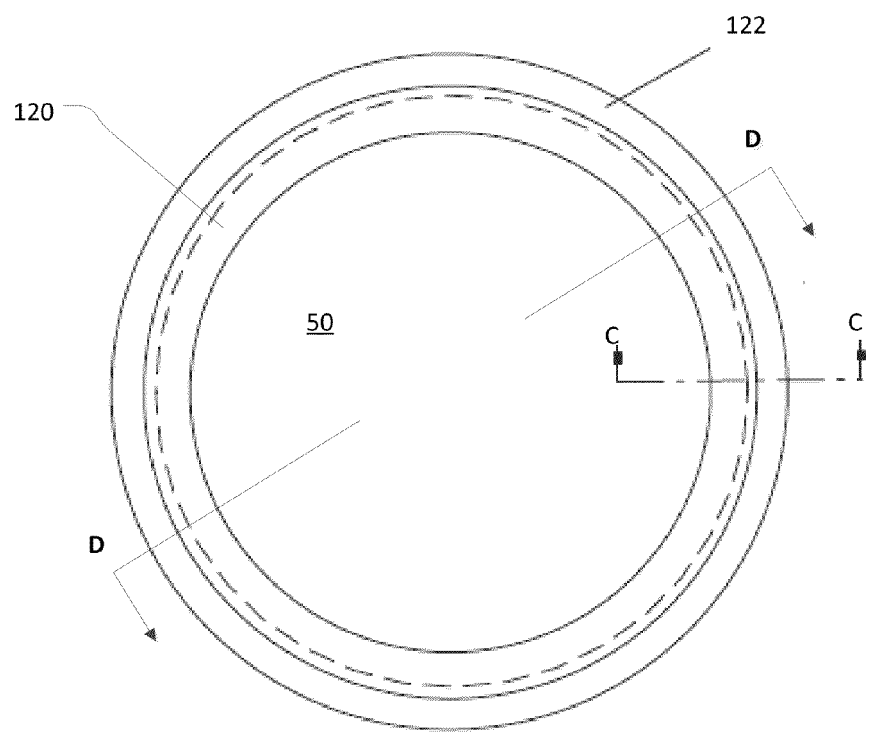
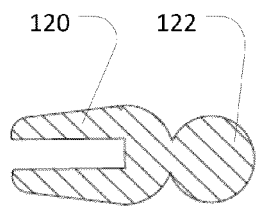 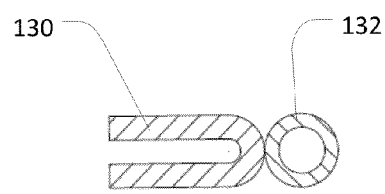 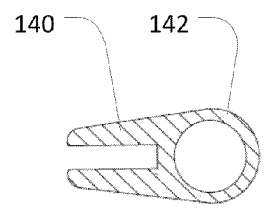
*Fig. 5*
*Fig. 6*  *Fig. 7*  *Fig. 8*

CYMBAL EDGE GUARD

CROSS-REFERENCE TO RELATED APPLICATION

This application claims the benefit of U.S. Provisional Application No. 61/718,467, entitled "CYMBAL EDGE GUARD," filed Oct. 25, 2012, which application is incorporated by reference herein in its entirety.

TECHNICAL FIELD

Embodiments of the present disclosure generally relate to add on devices for musical instruments, and, more specifically, devices that protect musical instruments.

BACKGROUND

As percussion instruments, cymbals are inherently brittle and susceptible to edge damage. This is due, in part, to the fact that cymbals are round and can be cumbersome to handle, but more so to the nature of their construction and metal-alloy composition. Cymbal metal is typically comprised of bell bronze, which is a blend of copper and tin. Varying proportions of silver are added as a catalyst for bonding the copper and tin. The final result is an instrument that is built for sound and appearance but not durability.

Many cymbals, particularly those of high quality, also tend to be hand hammered and hand lathed. The combination of semi-custom handcrafted construction with various alloy metals produces an instrument that can be lovely to hear yet easy to fracture. Moreover, knowing what basic metals have been mixed isn't enough to predict fragility since no two companies manufacture cymbals the same way. Variances in percentages of metals mixed, the order of mixing, the inclusion of admixtures, and preferred temperatures and pressures all equate to manufacturing methods that remain top secret and guarded from one company to another.

Cymbal damage can occur in any number of ways. Irreparable cracks, chips, and dents can occur when a cymbal is dropped, mishandled, or tipped over edgewise onto a hard surface, whether unmounted or mounted on a stand. Cymbal damage can also occur when cymbals are insufficiently padded when shipped, carelessly stacked on each other, or thrown edge-wise into vertical racks. Besides being sonically impaired or useless to the user or owner, damaged cymbals are time consuming and expensive to replace.

When played, cymbals can also be loud. Especially to those who do not want to hear them. Musicians who rehearse and practice the art of drumming with cymbals can disturb others, whether at home, in clubs, in music schools, or anywhere where loud noise might be deemed offensive. Playing in these settings may require limiting cymbal noise. The Cymbal edge guard completely deadens cymbal noise by restraining cymbal edge vibrations.

When they are not being played, cymbals are often displayed, stored, and transported while mounted on cymbal stands. When they are being played, such as between performance sets or practice sessions, mounted and unprotected cymbals on stands are vulnerable to edge damage by falling and impact. Examples of environments where this can happen include, but are not limited to, between musical performances, on stage, in studios, in stores, and at home. One method of protecting cymbals is to remove them from their stands and carry and store them in bags or hard shell cases. This practice does not work to adequately protect individual cymbals when they are stored naked and exposed on cymbal stands, when left lying flat horizontally, or when left in a leaning position against a vertical surface. Of course, cymbals can also be unintentionally dropped and receive edge damage, whether they are stored in a cymbal bag or vault.

The purpose of the cymbal edge guard is to provide a secure, economical, convenient and durable means of cushioning, restraining, and protecting cymbals in all settings whether they are mounted on cymbal stands, or unmounted, stored in bags, vaults, or racks, regardless of cymbal location, type, style, manufacturer, or size.

SUMMARY

An aspect of the present disclosure is a cymbal edge guard. The edge guard can be described as a generally U-shaped, flexible annulus, the open end of the annulus being oriented toward the center of the annulus, the annulus being dimensioned to fit over the outer perimeter of a cymbal. The edge guard may further include a gripping tongue, formed within the U-shaped portion of the annulus. Additionally, a protective bulb may be integrally formed with the outer edge of the edge guard. A double cymbal edge guard may further be provided, dimensioned to fit over the outer parameters of a matched pair of cymbals, the cymbals being arranged to bottom to bottom with the peripheral edges in registration.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

FIG. 5 is a plan view of another embodiment of a cymbal edge guard in accordance with the present disclosure.

FIG. 6 is a cross-sectional view of one variation of the cymbal edge guard of FIG. 5, taken on plane C-C.

FIG. 7 is a cross-sectional view of another variation of the cymbal edge guard of FIG. 5, taken on plane C-C.

FIG. 8 is a cross-sectional view of a further variation of the cymbal edge guard of FIG. 5, taken on plane C-C.

DETAILED DESCRIPTION OF ILLUSTRATIVE EMBODIMENTS

The following detailed description illustrates aspects of the disclosure and its implementation. This description should not be understood as defining or limiting the scope of the present disclosure, however, such definition or limitation being solely contained in the claims appended hereto. Although the best mode of carrying out the invention has been disclosed, those in the art would recognize that other embodiments for carrying out or practicing the invention are also possible.

Figure 1:
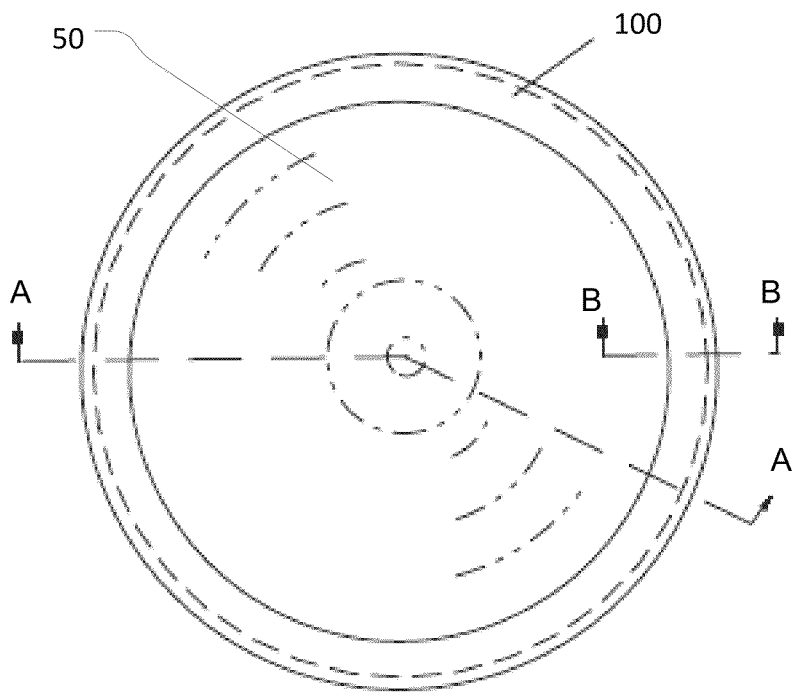
FIG. 1 is a plan view of one embodiment of a cymbal edge guard in accordance with the present disclosure.

FIG. 1 depicts an embodiment of a cymbal edge guard 100 of the present disclosure. Edge guard 100 is an annular, U-shaped member, with its open end facing inward toward the center of the element. Structural details of the edge guard 100 will be set out in greater detail below, but it can be seen in FIG. 1 that edge guard 100 is dimensioned to fit over the outer edge of a cymbal 50.

Edge guard 100 is manufactured to fit over a particular size cymbal. Cymbals are provided in a number of diameter classifications, and particular cymbal diameters can vary greatly within the same diameter classification. Tolerances commonly range between one-sixteenth and five-sixteenths of an inch on either side of even-inch diameter classifications. Cymbals typically range in size from four inches to twenty-four inches in diameter, and more, depending on the manufacturer, model number, and actual finished dimension of the cymbal.

Figure 2:
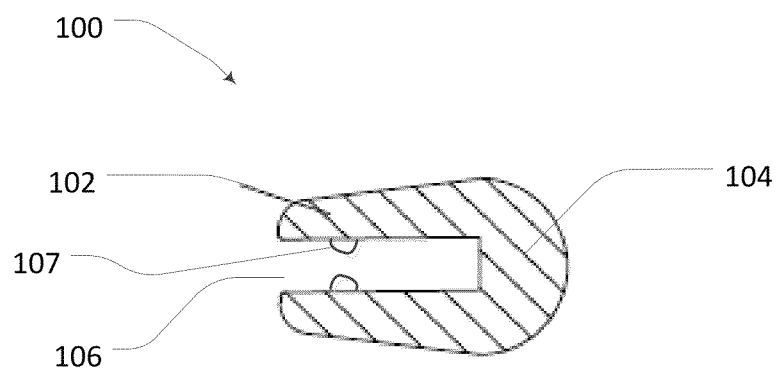
FIG. 2 is a cross-sectional view of the cymbal edge guard of FIG. 1, taken on plane B-B.
Figure 4:
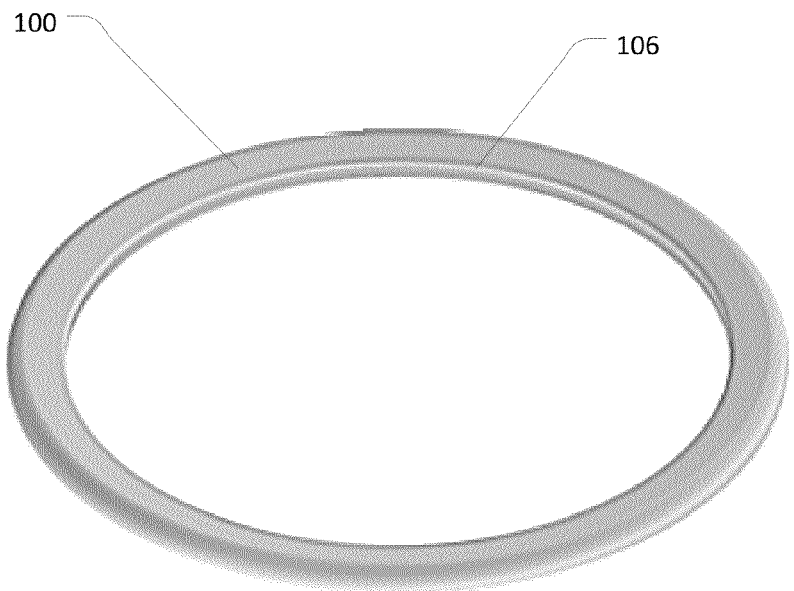
FIG. 4 is a perspective view of the cymbal edge guard of FIG. 1.

FIGS. 2 and 4 provide further structural detail for the embodiment of FIG. 1. Seen most clearly in FIG. 2, edge guard 100 forms a U-shape, with a base element 104 and two generally parallel arms 102. A slot 106 lies between the arms 102. Dimensions of a particular unit of this embodiment may vary in size and shape, varying such parameters as diameter, slot width, slot depth, material thickness, overall width and length. The shape of the slot can also vary, with possible examples including square, U-shaped, rectangular, triangular, or practically any shape able to capture, cover, and secure the complete edge of the cymbal.

A gripping tongue 107 may be formed within slot 106. This element consists of one or more protrusions extending inward from the sides of slot 106, size can dimensioned to exert a gripping force on cymbal 50 when edge guard 100 is mounted. The illustrated embodiment employs to such protrusions to form gripping tongue 107. On some embodiments, however, a single protrusion may be provided, while other embodiments may include more than two protrusions. Still other embodiments may omit the gripping tongue 107 altogether.

Figure 3:
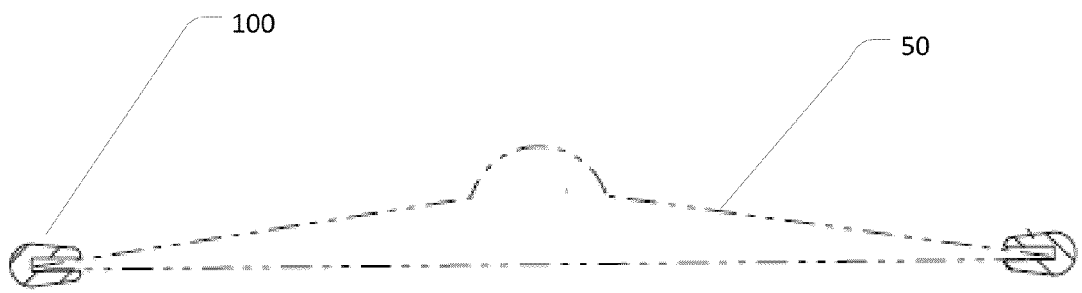
FIG. 3 is a lateral cross-sectional view of the cymbal edge guard of FIG. 1, taken on plane A-A.

The perspective view of FIG. 3 sets out the overall form of the embodiment. In general, edge guard 100 forms an annulus, with the slot 104 opening to toward the center of the device. The arms 102 may be formed to be more narrow at their end points than at the point where they meet the base 104, thus providing gripping action to maintain the element's position on the protected cymbal.

FIG. 3 presents the edge guard 100 mounted for use on a cymbal 50. Dimensions are chosen to provide a firm grip onto the cymbal by the element's arms 102. Further, one can understand from this illustration how multiple cymbals can be stacked, without necessitating any direct metal-to-metal contact between adjacent cymbals. By limiting the contact to the edge guards 100, one eliminates possible damage from mutual impact, as well as eliminating noise during transport.

It should be noted that edge guard 100 provides an additional advantage, in that this device, when mounted, effectively deadens the sound of the cymbal. Thus, one can practice noiselessly. In contrast, devices that permit relatively silent practice do not provide a realistic feel for the player, so such practice is to a large extent artificial. Here, because the player is striking the actual surface of the cymbal, the tactile characteristics of play are all present, permitting a completely realistic practice experience.

An edge guard 100 can be constructed by connecting lengths, or ends of one length, of grooved channel stock made of a number of resilient materials. Suitable examples include neoprene, dense neoprene, EPDM, sponge, silicone, foam, SBR, Nitrile, closed cell and open cell rubber, and natural and/or synthetic rubbers. Other suitable materials lengths of PVC, vinyl, plastic, polymers and copolymers, PVC Nitrile, polyurethane, thermoplastic elastomers, hybrid polymers, fluoropolymer elastomers, thermoplastic materials, and PVC or polymers formed with, or without, an integrated and flexible metal or other rigid core or internal clip. Using such materials, those of skill in the art can devise a fabrication process for finished edge guards 100 employing a number of suitable processes. For example, lengths of a suitable material can be extruded in a desired cross-section, such as that seen in FIG. 2. The lengths can be severed into suitable lengths, and the ends fused to form an annulus.

Figure 9:
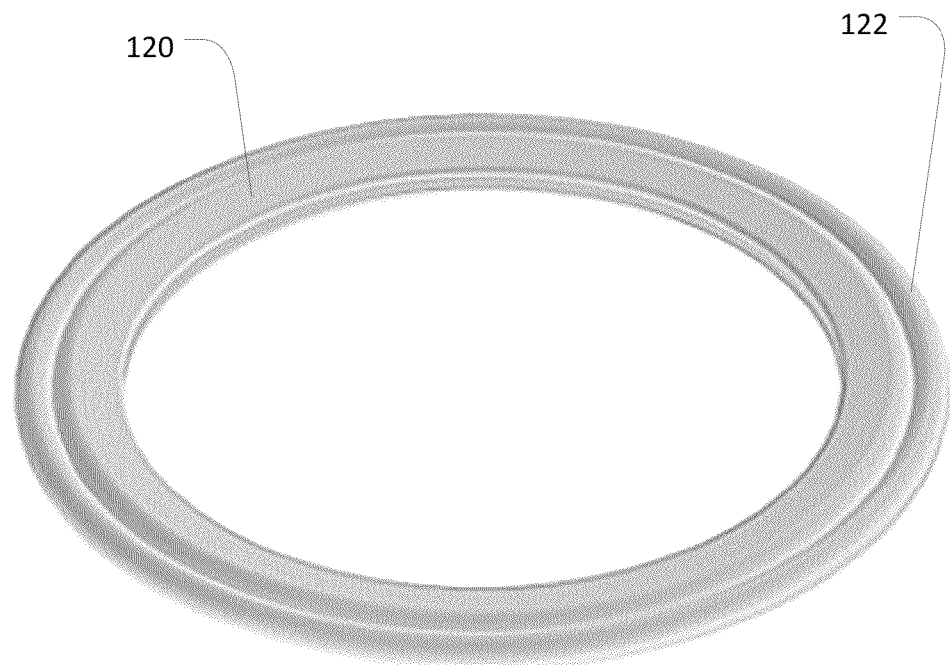
FIG. 9 is a perspective view of the cymbal edge guard FIG. 5.

FIG. 5 illustrates another embodiment, edge guard 120. This embodiment primarily differs from that of FIG. 1 by the inclusion of a bulb 122 around the outer circumference of edge guard 120. As also seen in FIG. 9, bulb 122 extends outward from edge guard 120, providing an additional measure of protection.

As best seen in FIGS. 6, 7, and 8, this element can take a number of forms. For example, FIG. 6 illustrates a basic embodiment of bulb 122, in which the bulb is a circular front of flexible material joined to the body of edge guard 120. Alternatively, FIG. 7 illustrates another embodiment of an edge guard 130, in which bulb 132 is a tubular element, having a hollow central bore. Comparing this embodiment with that of FIG. 6, bulb 132 offers an advantage of a cushioning effect, produced by the central area of bulb 132. That element exhibits a cushioning effect against impact, as deformation of the bulb 132 can compress the air or other gas contained within the bulb 132.

Bulbs 122 and 132 of FIGS. 6 and 7, respectively, appear to be separable elements from the edge guards 120 and 130. The embodiment of FIG. 8, on the other hand, includes a cushioning bulb 142 formed integrally with the base of edge guard 140. There, bulb 142 is simply a hollow area formed within edge guard 140. As noted above, the hollow area provides a cushioning effect against impact. Gripping tongues, as seen in FIG. 1 may be included in any of the embodiments shown in FIGS. 6-8, as desired.

Some embodiments, such as those illustrated in FIGS. 6 and 7, include a groove Separating the bulb from the edge guard. This groove can vary in size and shape including diameter, slot width, slot depth, material thickness, overall width and length, and whether they include single or multiple gripping tongues. The shape of the slot can also vary and be square, U-shaped, rectangular, triangular, or of any shape provided it captures, covers, and secures the complete edge of the cymbal.

Because larger diameter cymbals tend to be expensive and heavy, they are well suited for the additional shock restraint and protection afforded by cymbal edge guards with a bulb however, cymbals of any and all diameter will gain protection and sound deadening when fitted in a cymbal edge guard with or without additional bulb cushioning.

Bulbs can be attached to the outer edge of the grooved cymbal edge guard in many ways including, but not limited to, extrusion, co-extrusion, gluing, epoxying, lamination, one-piece molding, by adhesive, and by vulcanization. Bulbs can take many shapes including being round and solid, or round and tubular or hollow, and be of any diameter. Bulbs can take any shape including, round, square, elliptical, trapezoidal, U-shaped, triangular, finned, humped, notched, ribbed, star-shaped, include a flap, or be grooved with angular or multi-shaped ridges. Bulbs can be solid, hollow, or they may include vent holes.

Figure 10:
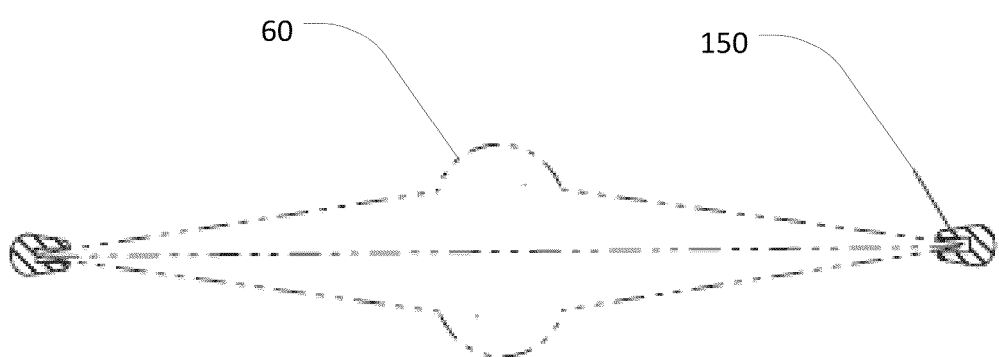
FIG. 10 is a lateral cross-sectional view of the cymbal edge guard of FIG. 5, taken on plane C-C.

FIG. 10 sets out a further embodiment of an edge guard 150. Previous embodiments were all discussed in illustrated as accommodating and protecting a single cymbal. Here, edge guard 150 is formed with a wider slot, or channel, suitable for enclosing and protecting the edge perimeter of a pair of matched same-diameter cymbals. The edge guard slot, or channel, width and depth can be increased or decreased in order to enclose and protect any range of cymbal or gong edge thicknesses.

Cut lengths of grooved channel stock, with or without a bulb, can be joined, spliced, or bevel spliced together by mechanical, chemical, or molded means including, but not limited to, being sewn, stitched, riveted, stapled, taped, glued, cold glued, cold bonded, epoxied, encased, hot spliced, cold spiced, vulcanized, or joint molded into rings. Embodiments can also be seamless. For example, they can be manufactured by means of injection molding.

Although the above description specifies alternative materials, shapes, configurations, and construction methods for manufacturing flexible cymbal edge guards, the scope of embodiments also includes hard-shell alternatives. For example, the cymbal edge guard can be constructed of equal halves of curved hard stiff material, each being grooved and of equal dimension, radii and length, and connected via a hinge on one end of each half. By adding shock-absorbing material to the grooves of each half, the halves can be closed and clamped tight around a cymbal's edge thus affording similar protection as the aforementioned flexible embodiments. Another embodiment could consist of multiple rigid or flexible segments designed to link or be joined together for purposes of fitting neat to a cymbal's edge. Another embodiment could include an adjustable edge guard useful for fitting to the peripheral circumference of any cymbal or gong manufactured, regardless of diameter, profile, thickness, or material.

I claim:

1. A cymbal edge guard, comprising: a generally U-shaped, flexible annulus having a gripping tongue formed therein, the open end of the annulus being oriented toward the center of the annulus, the annulus being dimensioned to fit over the outer perimeter of a cymbal.

2. The cymbal edge guard of claim 1, further comprising a protective bulb, generally circular in form, integrally formed with the outer edge of the cymbal guard.

3. The cymbal edge guard of claim 2, wherein the protective bulb is tubular.

4. The cymbal edge guard of claim 1, wherein the cymbal edge guard is formed of a resilient material.

5. The cymbal edge guard of claim 2, wherein the cymbal edge guard and the protective bulb are is formed of a resilient material.

6. A double cymbal edge guard, comprising: a generally U-shaped, flexible annulus having a gripping tongue formed therein, the open end of the annulus being oriented toward the center of the annulus, the annulus being dimensioned to fit over the outer perimeters of a matched pair of cymbals, the cymbals being arranged bottom to bottom with the peripheral edges in registration.

7. The double cymbal edge guard of claim 6, further comprising a protective bulb, generally circular in form, integrally formed with the outer edge of the cymbal guard.

8. The double cymbal edge guard of claim 7, wherein the protective bulb is tubular.

9. The cymbal edge guard of claim 6, wherein the cymbal edge guard is formed of a resilient material.

10. The cymbal edge guard of claim 7, wherein the cymbal edge guard and the protective bulb are formed of a resilient material.

* * * * *